United States Patent Office 2,988,378
Patented June 13, 1961

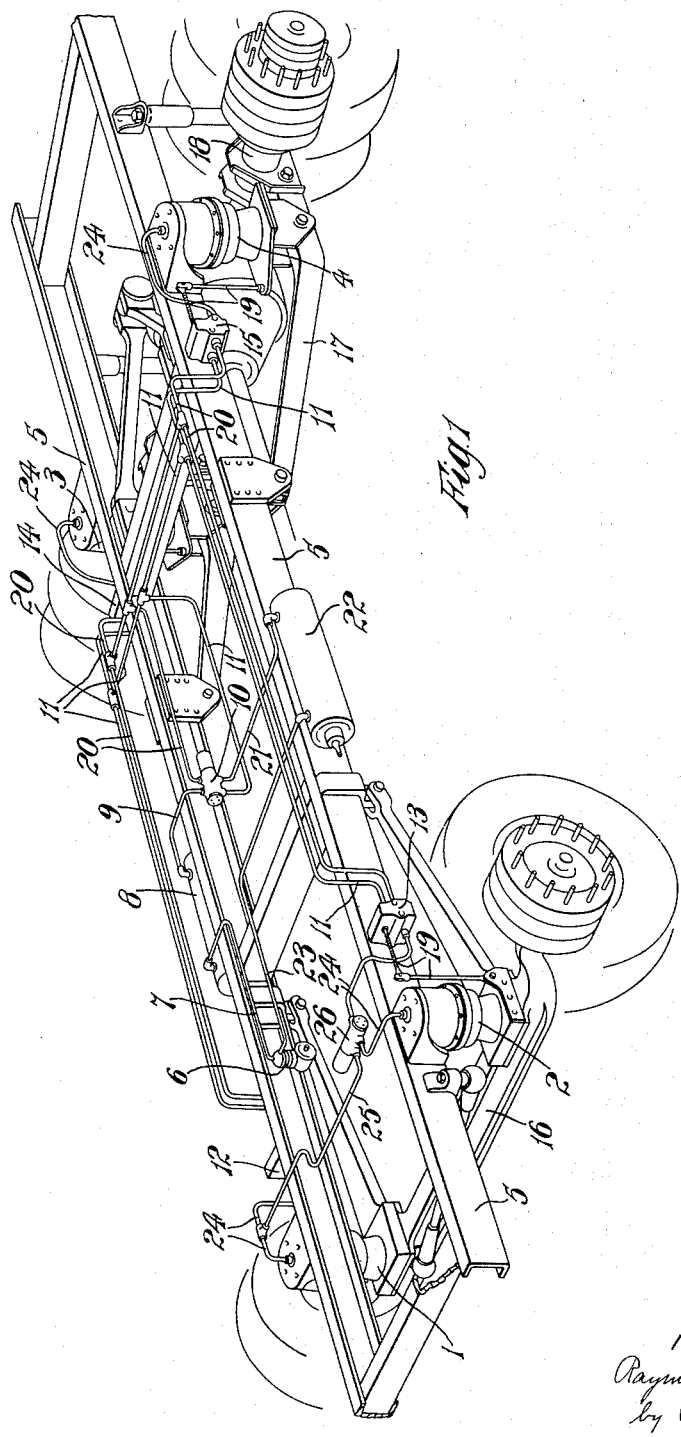

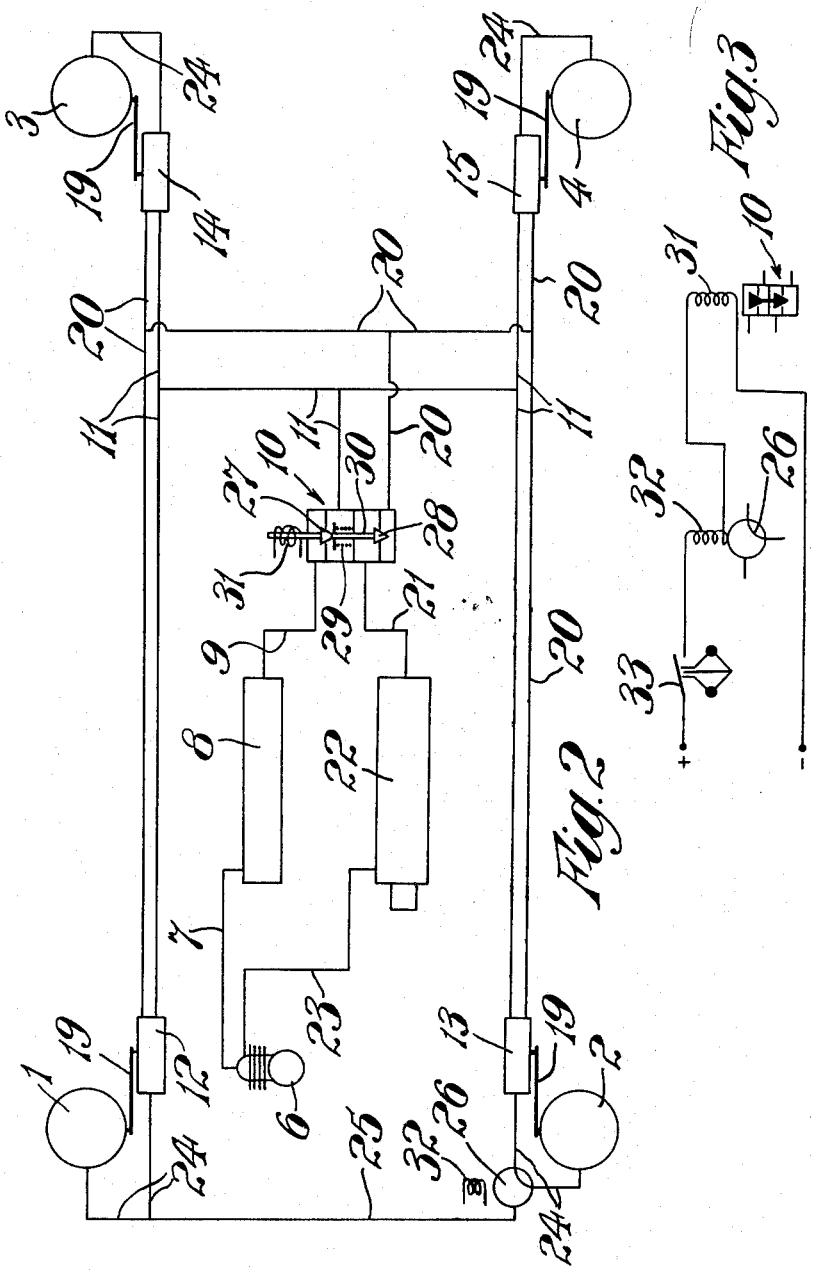

2,988,378
FLUID SUSPENSION AND LEVELLING SYSTEM FOR VEHICLES
Raymond John Davies, Coventry, England, assignor to Dunlop Rubber Company Limited, London, England, a British company
Filed June 9, 1959, Ser. No. 819,100
Claims priority, application Great Britain June 21, 1958
11 Claims. (Cl. 280—124)

This invention relates to suspension systems for vehicles, of the type comprising a fluid spring associated with each road wheel and means for maintaining the height of the vehicle body or chassis a predetermined distance above the ground irrespective of variations in the loading on the body or chassis.

The term "wheel" as used herein is intended to include either one wheel or a group of wheels which are located adjacent one another; for example, each pair of wheels at each end of one axle of a six-wheeled vehicle is referred to as "a wheel." Moreover, the term "fluid spring" is also intended to include a group of fluid springs which are permanently connected together and are associated with a single wheel) as hereinbefore defined).

When the vehicle is moving the load does not usually vary and it is preferable for each corner, i.e. each fluid spring associated with a wheel, to be independently levelled to maintain the body or chassis level. This independent levelling on all springs is particularly desirable when, as is usually the case, each spring is designed to have a variable rate which increases towards the fully extended and fully deflected positions, the latter usually being known as "rebound" and "bump" respectively.

It is difficult, however, to level all four corners when the vehicle is stationary and resting on uneven ground without placing an undesirable twist in the body or chassis and causing unnecessary stresses, since as the levelling valves try to keep the body or chassis parallel with an uneven surface they are acting against one another. Moreover, since it is possible, on uneven ground, with the vehicle stationary, for a single levelling valve to place its associated spring in communication with a source of fluid, or with exhaust, the vehicle, as it moves off, may be unbalanced.

The problem of static levelling may be overcome in known manner by providing only three levelling valves, e.g. two at the rear and one at the front, but this arrangement introduces further difficulties when the vehicle is in motion.

The object of the present invention is to provide a suspension system for vehicles wherein these disadvantages are largely overcome.

According to the invention a suspension system in or for a vehicle having four road wheels, a fluid spring associated with each wheel and a levelling valve mechanism associated with each fluid spring to maintain constant the length of that spring irrespective of the load thereon and independently of the other springs, comprises means to control the length of two of said springs through a single levelling valve only following receipt of a predetermined signal.

The system is such that four-point levelling i.e. levelling of each spring independently of the others, is obtained when the vehicle is moving at appreciable speed, and three-point levelling i.e. levelling of two springs independently and of a further two independently of the first two but synchronously with each other, is obtained when the vehicle is stationary or moving slowly. The signal may be provided through a centrifugal-type mechanism or fluid pressure pump operated from the output side of the vehicle transmission and operable to make the transfer from three-point to four-point levelling when the vehicle is moving faster than a predetermined speed. Alternatively the signal may be provided by turning an ignition key, opening or closing a door or the like and in these cases the transfer from three-point to four-point levelling, and vice versa, would take place with the vehicle stationary.

A further possibility is to fit a pump which is operated by movements of a part of the suspension system, and mechanism operated by the pump so that the transfer is made when the vehicle motion warrants it.

In order that the invention may be better understood and carried into practice, reference will now be made to the accompanying drawings, wherein:

FIGURE 1 is a perspective view of the chassis of a six-wheeled vehicle provided with a fluid suspension system;

FIGURE 2 is a diagrammatic representation of the suspension system; and

FIGURE 3 is a diagrammatic representation of the electrical circuit of the system.

The system shown in the drawings comprises four fluid springs 1, 2, 3, 4, which are associated respectively with the four corners of the vehicle chassis 5. A compressor 6 is mounted on the chassis and its outlet is connected via a conduit 7, a high pressure tank 8, a further conduit 9, a delivery valve mechanism 10, and a series of conduits 11, to four levelling valve mechanisms 12, 13, 14, 15 each of which is associated with one of the springs.

Each of the front springs 1, 2, is interposed between a front axle 16 and the chassis, and each of the rear springs 3, 4, is similarly interposed between the chassis and a radius arm 17 pivoted to the chassis and the rear axle 18. Each of the levelling valves is secured to the chassis and is connected by a lever and linkage system 19 to the end of the corresponding spring which is associated with the front axle or radius arm.

Each levelling valve is also connected to a low-pressure tank 22 via conduits 20, 21 and the delivery valve mechanism 10, and the said tank is connected to an inlet side of the compressor via conduit 23. Furthermore each spring is connected to its associated levelling valve by a conduit 24, so that air may be admitted to each spring from the compressor or exhausted from each spring to the compressor.

The flow of air to or from each spring is controlled by inlet and exhaust valves in the corresponding levelling valve, the said valves being opened and closed by movement of the chassis acting through the lever and linkage systems in known manner.

One of the front springs, for example the off-side spring 1, is connected by a pressure line 25 to the other front spring 2, hereinafter termed the near-side spring, and interposed in said line, adjacent the near-side spring, is a three-way cock 26 which is also located in the conduit 24 connecting the near-side spring with the near-side levelling valve through said three-way cock. The cock has two alternative positions in one of which the near-side levelling valve directly communicates with the near-side spring and the cock prevents communication between the near-side and off-side levelling valves and springs, and in the other of its alternative positions the near-side levelling valve 13 is disconnected from the near-side spring, but the latter directly communicates with the off-side levelling valve 12 and spring 1.

The delivery valve mechanism 10 previously referred to is of the fast and slow flow type and comprises a high-pressure side (see FIGURE 2) having an inlet valve 27 therein to permit high pressure fluid to pass from the conduit 9 to conduits 11, i.e. from the high pressure tank to the levelling valves and springs, and a low-pressure side having an exhaust valve 28 therein to permit low pressure fluid to pass from conduits 20 to conduit 21, i.e. from the springs and levelling valves to the low-pressure tank. When the vehicle is stationary or moving only very slowly, these valves 27, 28 are opened widely by a spring 29 to enable a speedy levelling response to be obtained. When the vehicle is moving more quickly a slower response is required and this is obtained by moving both valves to a near-closed position which throttles the flow of pressure fluid in both directions. Valves 27, 28 are mounted on a common spindle 30 for operation by a solenoid 31, which, when energised, holds the valves in the near-closed position.

The three-way cock 26 is also operated by a solenoid 32, so that upon energization of the solenoid 32 it is moved to a position which gives four-point levelling, i.e. to a position in which each of the front springs 1, 2 is independently connected by its associated levelling valve 12 or 13. The cock is movable to its other position by spring means.

Both solenoids are connected in series (see FIGURE 3) into an electrical circuit in which is incorporated a centrifugal-governer operated switch mechanism 33 which is associated with the transmission of the vehicle so that when it is moving at more than a predetermined speed the switch closes the circuit and energizes the solenoids so as to change over the delivery valve mechanism from fast flow to slow flow and at the same time change over the vehicle levelling from three-point to four-point. When the vehicle is travelling at less than said predetermined speed the switch is opened by an associated spring (not shown) to de-energize the solenoids and thus automatically change back to three-point levelling and fast flow.

Having now described my invention—what I claim is:

1. A vehicle suspension system having four fluid springs, one for each of two front wheels and two rear wheels, an individual levelling valve for each spring, a common pressure-fluid supply system connected to each of said valves, a connecting pressure line from one front spring to the other and a three-way valve between one of said front springs and its levelling valve and between said front spring and said connecting pressure line to connect said front spring alternatively with its levelling valve and with said pressure line.

2. The system of claim 1 comprising a compressor connected to said common fluid-pressure supply system and an inlet valve mechanism between said compressor and said common pressure-fluid system supply to control the flow of fluid to said springs.

3. The system of claim 2 comprising an exhaust system from all of said levelling valves to the inlet of said compressor.

4. The system of claim 2 comprising an exhaust system from each said levelling valve and an exhaust valve between the inlet of said compressor and said exhaust system.

5. A system as claimed in claim 4 comprising high and low pressure tanks interposed between the levelling valves and the compressor outlet and inlet respectively.

6. A system as claimed in claim 4 wherein said inlet and exhaust valves are coupled and are movable together between two positions, in one of which fast flow to and from the compressor is possible, and in the other of which slow flow only is possible.

7. A system as claimed in claim 6 comprising means to move the inlet and exhaust valves synchronously with the three way valve, so that fast flow is possible when the three way valve is in the position in which the said two springs are in communication with each other via the pressure line, and slow flow only is possible when the springs are isolated.

8. A system as claimed in claim 7 wherein the inlet and exhaust valves and three way valve are spring loaded away from the slow flow position towards the fast flow position.

9. The system of claim 7 comprising solenoids operatively connected to said three-way valve and said inlet and exhaust valves.

10. The system of claim 9 comprising an electric circuit to energize said solenoids and a switch to open and close said circuit.

11. A system as claimed in claim 10 comprising a cen-switch when the vehicle exceeds a predetermined minimum.

References Cited in the file of this patent
UNITED STATES PATENTS 2,862,726    Bertsch _____ Dec. 2, 1958